[11] 3,601,575

| [72] | Inventors | Edgar Meyer<br>Gilching;<br>Joachim Geissler, Vaterstetten, both of, Germany |
|---|---|---|
| [21] | Appl. No. | 804,342 |
| [22] | Filed | Jan. 24, 1969 |
| [45] | Patented | Aug. 24, 1971 |
| [73] | Assignee | K. H. Steigerwald GmbH<br>Wasseralfingen, Germany |
| [32] | Priority | July 24, 1964 |
| [33] | | Germany |
| [31] | | St 22453 |
| | | Continuation of application Ser. No. 473,355, July 20, 1965. |

[54] METHOD AND APPARATUS FOR VIEWING THE IMPACT SPOT OF A CHARGE CARRIER BEAM
5 Claims, 12 Drawing Figs.

[52] U.S. Cl. ............................................. 219/121, 250/49.5
[51] Int. Cl. ........................................................... B23k 15/00
[50] Field of Search ................................................ 219/69, 121 E, 121 B, 121; 250/49.5

[56] References Cited
UNITED STATES PATENTS

| 2,267,137 | 12/1941 | Ruska et al. | 250/49.5 |
| 2,561,988 | 7/1951 | Longini | 250/49.5 |
| 2,928,943 | 3/1960 | Bartz et al. | 250/49.5 |
| 3,150,257 | 9/1964 | Wilska | 250/49.5 |
| 3,158,733 | 11/1964 | Sibley | 219/121 |
| 3,196,246 | 7/1965 | El-Kareh | 219/121 |
| 3,221,133 | 11/1965 | Kazato et al. | 219/121 |
| 3,235,727 | 2/1966 | Shapiro | 250/49.5 |
| 3,283,120 | 11/1966 | Spruck | 219/121 |
| 3,308,264 | 3/1967 | Ullery | 219/121 |

Primary Examiner—R. F. Staubly
Assistant Examiner—R. E. O'Neill
Attorney—Sandoe, Hopgood & Calimafde ABSTRACT: A viewing system for monitoring the focus of a beam of charged particles at the impact spot in apparatus using such beam for the machining of a workpiece is described. The viewing system utilizes the charged-particle radiation moving reversely with respect to the beam from the impact spot and focuses this in an image plane. A fluorescent screen is provided in the image plane and behind the screen is a photoelectric detector having a photosensitive area smaller than the image of the particles on the screen whereby the intensity of the radiation incident upon the photoelectric device can be used an an indication of the focus of the beam on the impact spot. Various devices are illustrated and described.

Inventor:
EDGAR MEYER
JOACHIM GEISSLER

Inventor:
EDGAR MEYER
JOACHIM GEISSLER

Inventor:
EDGAR MEYER
JOACHIM GEISSLER

METHOD AND APPARATUS FOR VIEWING THE IMPACT SPOT OF A CHARGE CARRIER BEAM

This application is a continuation of application Ser. No. 473,355, filed July 20, 1965.

This invention relates to an improved viewing system for checking the focus of a beam of charged particles upon an impact spot in equipment using the beam for machining of a workpiece.

Charge carrier beam equipment, and above all, equipment using such beams for the purpose of machining, require the beams's impact spot on the subject be observed in order that the focus can be adjusted to the desired, usually minute size. In addition, it is often desirable to be able to observe the shape of the beam's impact spot, so that a certain, usually round focus, can be obtained by an appropriate adjustment of various focusing fields.

It is of prior art to check the dimensions of the beams's focus in charge carrier beam equipment by light optical means. However, due to the relatively small aperture of the optical light path which normally passes through the pole shoes of the electron-optical focusing lens, such a light-optical checking system has an insufficient resolving power. Small foci can, therefore, no longer be observed and checked with sufficient accuracy.

In addition, most of the known types of light-optical viewing systems have a glass lens disposed in the corpuscular beam device proper, and this lens is provided with a central bore to allow the corpuscular beam to pass. The optically best suited center portion of the lens is, thus, inevitably lost for observation, i.e., a degraded image has to be tolerated. This is another reason why small foci cannot be observed with sufficient accuracy.

Another drawback of the light-optical viewing system is the fact that the optical lens incorporated in the corpuscular beam device is quickly covered with evaporated material in the course of the machining process, so that it becomes unsuitable for further use. A protective glass plate is, therefore, arranged in front of the lens, which collects the evaporated material and must, therefore, be replaced from time to time.

If a high-power beam is used, the protective glass must be replaced very often. This is, of course, accompanied by frequent, undesirable interruptions of the work.

It is also prior art to check the focusing of a beam of charged particles by arranging a collecting electrode above the workpiece to be machined and to measure the current intercepted. When this current reaches an extreme value, this is interpreted to be equivalent to optimal focusing. This method has the disadvantage that it works properly only with a few materials and that, moreover, the adjustment is not made for minimum diameter of focus, but for maximum temperature at any point of the impact area. In addition, this method does not provide any information on the size and shape of the impact spot of the beam.

The purpose of the present invention is to indicate a process for checking the size and/or shape of the beam's impact spot, which is free from the disadvantages of previously known processes and which, moreover, offers a number of essential advantages. It is also the purpose of this invention to provide a device for carrying out the new process, which is of simple design in spite of its high efficiency.

The invention, thus, refers to a process for checking the size and/or shape of the beams's impact spot in equipment using a charged particle beam for machining. According to the invention, the particles and/or X-rays reflected from the impact spot of the beam are used for such a check.

In this connection, it is particularly advantageous to image the impact spot by charge carrier optical means, with the aid of the particle radiation reflected from it, onto a radiation detector which supplies information on size and shape of the image formed. If, for example, a fluorescent screen is used as a radiation detector, the corresponding sizes of the beam's impact spot can be directly deduced from the size and shape of the image formed on this screen. In this manner, even small and minute impact spots can be observed without difficulty and can even be measured. If the viewing beam is bent along the axis by a suitable deflection field, observation is, in addition, no longer disturbed by the vapor emanating from the object struck by the beam, i.e., perfect viewing over a prolonged period is guaranteed even when a high-power beam is used.

In some cases, particularly for checking large impact spots, it may be of advantage to image the impact spot by means of the particle and/or X-rays reflected from it through a small pinhole diaphragm onto a radiation detector providing information on the size and shape of the image formed. While a device for applying this viewing method is of extremely simple design, the check it makes possible will, in many cases, be entirely sufficient.

In a particularly simple application of the new technique, the particle and/or X-ray radiation reflected from the beam's impact spot may also be used to project the shadow image of a knife edge onto a radiation detector. In this case, the radiation detector must above all provide information on the edge sharpness of the image formed. When the separation between impact spot, knife edge and radiation detector is known, the size of the impact spot can be directly deduced from the edge sharpness obtained. If a closed edge, i.e., a hole, is used, the course of the edge sharpness of the shadow image will, in addition, provide information on the shape of the beam's impact spot.

It is obvious that in the latter case the diameter of the hole may be considerably larger than if the impact spot were imaged through a pinhole diaphragm. Another advantage of the new method is the fact that it also permits the surroundings of the beam's impact spot to be observed in a simple manner. In this case, the surroundings to be observed are covered with an additional, preferably defocused beam. Together with the impact spot of the beam employed for machining, the area covered is imaged on a radiation detector, preferably a fluorescent screen, by the particle and/or X-ray radiation reflected from the area covered by the additional beam. The result is a bright image of the impact spot which permits exact checking of the size and shape of this spot, and a darker image of the surroundings which permits the beam to be exactly positioned.

If a beam having a sufficient angle of beam aperture is used for machining, the focusing arrangement can be chosen so that only part of the beam is employed for the machining process, while another part of the beam covers the surroundings to be imaged. In this case, a special illuminating beam is thus no longer required. Taking into account the spherical aberration of the imaging lens, the beam may, for example, be focused so that its central portion is used for machining, while an outer, annular zone of the beam illuminates the surroundings to be observed.

If the machining process permits short-time interruptions (pulsed beam, intermittent operation), the beam serving for machining may also be used to form an image of the surrounding area without any additional optical means. During the short interruptions in machining, the beam is then either deflected rapidly, e.g., in the form of scanning, to cover the area to be imaged, or its impact zone is artificially enlarged by means of defocusing.

A preferred device for the application of the method covered by the present invention consists of a viewing system which contains at least one charge-carrier-optical imaging lens and one radiation detector and which is arranged so that it intercepts at least part of the corpuscular radiation reflected from the beam's impact spot.

Of particular advantage is the use of a fluorescent screen as a radiation detector, which will then directly display a true-to-scale image of the impact spot.

Under certain conditions, it may also be advisable to use appropriate deflection fields in order to project the image by a scanning-type motion onto a photoelectric detector of lesser size than the image, whose voltage controls the intensity of an oscillograph ray synchronized with the scanning motion. In this case, any desired image scale can be chosen.

If only the size of the beam's impact spot is to be checked, the radiation detector may also be a photoelectric detector, which is again smaller than the image of the impact spot formed on it at the desired optimal focusing of the beam, and which is connected to an indicator.

When this radiation detector is moved to the center of the corresponding image, the indicator connected to it will show maximum deflection when the beam is optimally focused. When the detector is moved to the edge of the corresponding image, a minimum deflection will be obtained when the beam is optimally focused.

If a beam of charged particles is used for machining, charged particles are reflected from the impact spot of the beam, and these charged particles moving away from the impact spot at high speed are then intercepted by the viewing systems. At the same time, X-ray radiation is also reflected from the impact spot of the beam, which may be used as described above for checking the shape and/or size of the beam's impact spot.

If a viewing system is used for checking the size and shape of the impact spot, which images the particle radiation reflected from the impact spot by charge-carrier-optical means on a radiation detector, preferably a fluorescent screen, this viewing system may be arranged a tilted position with respect to the axis of the corpuscular beam so that it intercepts the corpuscles reflected to one side. In this connection, it will be found particularly advantageous to bend the axis of the viewing system, for example by a magnetic deflection field, in order to protect the fluorescent screen from evaporation. The viewing beam may be bent at any desired point, i.e., both between the impact spot and the image-forming lens and between the lens and the radiation detector.

The viewing system can also be arranged at right angles to the axis of the beam. In this case, it is indispensable that a deflection field be available between the impact spot and the viewing system for deflecting the particles reflected sideways towards the viewing system. No additional means are therefore required to protect the fluorescent screen from evaporation.

The viewing system may contain one or two image-forming lenses. It is particularly advantageous to provide two image-forming lenses and to use the one serving to focus the beam as a first image-forming lens. In this case, appropriate means, preferably magnetic deflection fields, have to be provided for separating the beam used for machining from the reflected particle radiation.

This arrangement offers another special advantage if it is required for the particular machining application to guide the machining beam, e.g., with the aid of a deflection system below the lens, in the desired manner over the workpiece. If in this case above all the elastically reflected charge carriers are used for imaging the impact spot, and if an electrical deflection field is employed for deflection, the image of the impact spot will remain stationary on the fluorescent screen even when the beam moves over the surface of the workpiece.

If a low-power beam is used for machining or if the viewing system images the impact spot of the beam at a particularly high magnification, the image formed on the fluorescent screen may be too weak. In this case, the viewing system should preferably be equipped with an image converter tube. Another possibility is to increase the energy of the reflected particle radiation by postacceleration, in order to obtain a brighter screen image.

The device covered by the present invention can also be used to automatically adjust a focus of minimum size. In his case, an arrangement may, for example, be provided which periodically changes the current flowing through the lens serving to focus the beam. A photoelectric detector is then arranged in front of the fluorescent screen of the viewing system, which will, for example, cover only the central portion of the screen image. This detector is connected to a system which maintains the current flowing through the focusing lens at a constant level when the detector current has reached a peak. With the aid of this device, the current flowing through the focusing lens is thus automatically adjusted so that a focus of minimum size will be produced. This automatic adjustment of a minimum-size focus can also be obtained if only a photoelectric detector is used as a radiation detector instead of a fluorescent screen.

Having briefly described the invention, it will be described in greater detail, along with other objects and advantages thereof, in the following detailed description which may be more easily understood by reference to the accompanying drawings, of which:

Figure 1:
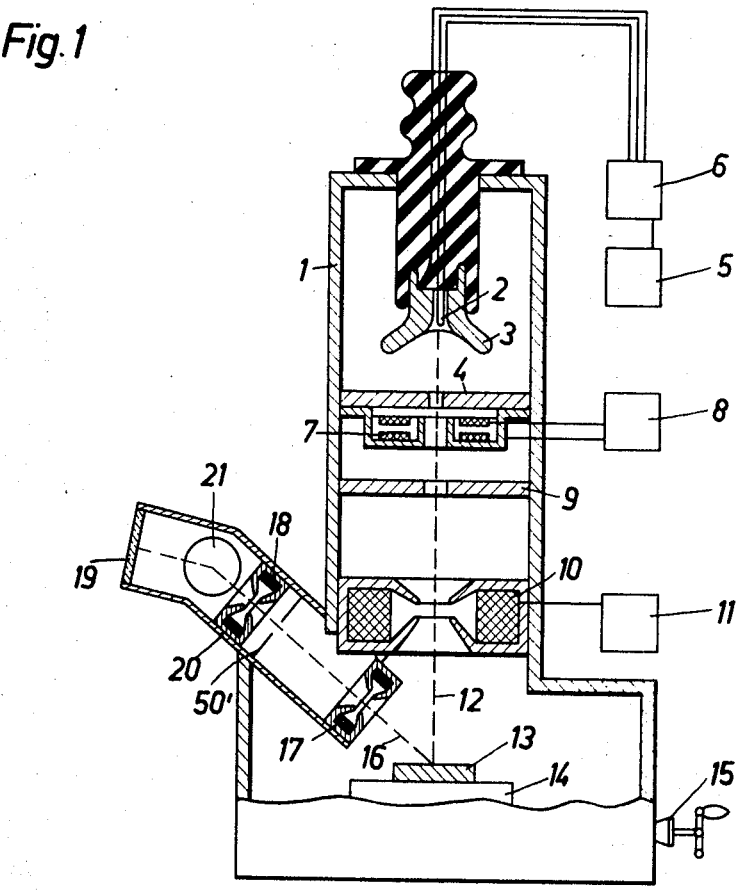
FIG. 1 is a partly sectioned side elevation of a device in accordance with the present invention.

In FIG. 1, there is shown a device 1 for machining material by means of an electron beam. The beam-generating system of this device consists of the cathode 2, the control electrode 3 and the grounded anode 4. The units 5 and 6 serve to generate the heating voltage for the cathode 2, the bias voltage for the control electrode 3, and the high voltage. In the direction of the beam, below the anode 4, is an electromagnetic deflection system 7 serving for beam adjustment. The unit 8 is the power supply unit of the deflection system 7. Below the system 7 is a diaphragm 9 which can be displaced in the diaphragm plane in a manner not illustrated in the drawing.

The electromagnetic lens 10 serves to focus the electron beam 12 on the workpiece 13. The lens 10 is supplied with power by the unit 11. The workpiece 13 rests on the schematically represented universal stage 14 which can be shifted from left to right by means of the crank 15 and from front to rear by another crank not shown in the drawing.

A portion 16 of the electrons reflected from the impact spot of the electron beam 12 on the workpiece 13 reaches the viewing system 20. This consists of the two image-forming lenses 17 and 18 which project an image of the impact spot of the beam onto the fluorescent screen 19. The size and shape of the beam's impact spot can be directly determined from the magnified image of the impact spot on the fluorescent screen 19. A thin diaphragm 50' is arranged in the plane of the first aerial image, which ensures that only electrons of a certain predetermined speed reach the fluorescent screen 19. The viewing system 20 is bent behind the lens 18, and a deflection field 21 (schematically illustrated) deflects the electrons 16 towards the fluorescent screen 19. The deflected path of rays in the viewing system protects the fluorescent screen 19 from damage and coating by material evaporated from the workpiece during working.

It is also possible to replace the fluorescent screen 19 by a photoelectric detector connected to an indicator. This detector must be slightly smaller than the image of the beam's impact spot formed on the detector when the desired optimal focusing of the electron beam 12 has been achieved. With this arrangement the focusing state of the electron beam 12 can be directly indicated by the deflection of the indicator's pointer.

Figure 2:
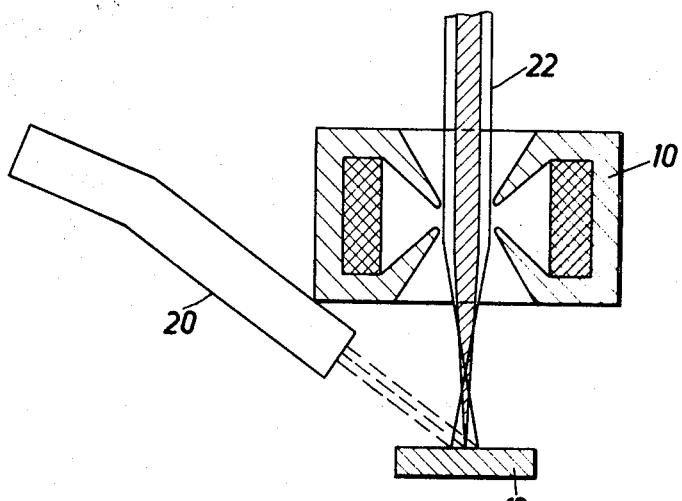
FIG. 2 is an enlarged view of a portion of the device shown in FIG. 1.

FIG. 2 is an enlarged view of a portion of the device shown in FIG. 1. A beam having a high angle of beam aperture is illustrated. Utilizing the spherical aberration of the focusing lens 10, the focusing of the beam 22 is chosen so that only the shaded central portion of the beam 22 is focused on the workpiece 13. The annular zone of the beam surrounding this central portion is here used to illuminate the surroundings of the beam's impact spot. With the aid of the viewing system 20, a bright image of the impact spot and a darker image of the surroundings of this spot can then be observed.

It is also possible to use the device shown in FIG. 1 in order at the same time to observe the surroundings of the beam's impact spot. For this purpose, the power supply unit 11 of the lens need only be controlled so that the lens 10 alternates between focusing and defocusing the beam 12. Furthermore, a deflection system 46 can be arranged below the lens 10 as is shown, for example, in FIG. 6, and a voltage can be fed to this deflection system, which will cause the beam 12 to stop in the respective machining position during successive intervals and to be deflected during the intermediate intervals so that it will cover the surroundings of the working point in a scanning-type pattern.

Figure 3:
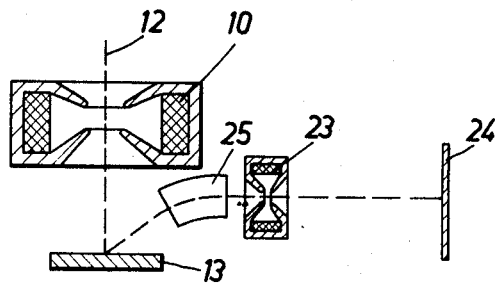
FIG. 3 is a cross-sectional view of another embodiment of a viewing system.

In the embodiment illustrated in FIG. 3, the viewing system consists of an image-forming lens 23 and the fluorescent screen 24. The viewing system is here arranged at right angles to the axis of the electron beam 12. An electromagnetic deflection field 25 serves to deflect the electrons reflected from the impact point of the beam into the axis of the viewing system 23, 24. This arrangement offers the advantage that even without a thin diaphragm it is essentially only electrons of a predetermined speed which reach the fluorescent screen 24. In addition, this arrangement may be made somewhat more compactly than that of FIG. 1, and the fluorescent screen is automatically protected from evaporation.

Figure 4:
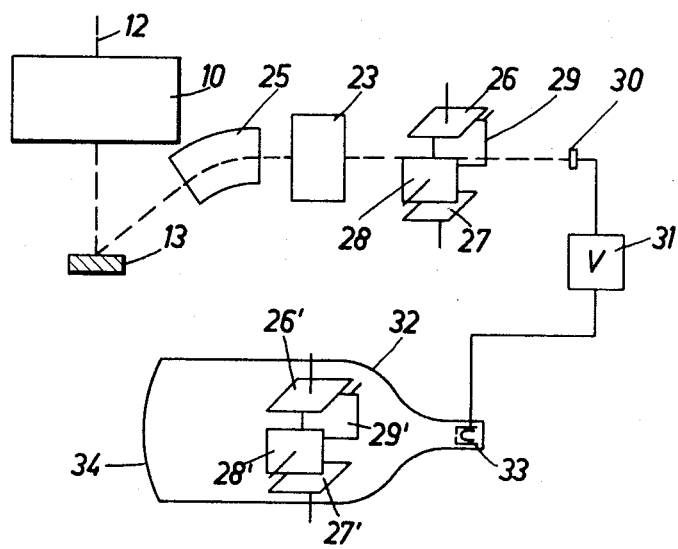
FIG. 4 is a perspective view of a viewing system using an oscillograph tube for image formation.

Instead of a viewing system provided with a fluorescent screen, a device of the type illustrated in FIG. 4 may be used. Here, the particle radiation passing through the image-forming lens 23 is moved by a deflection field applied between the deflector plates 26, 27 and 28, 29 in a scanning-type pattern over the photoelectric detector 30 which is smaller than the image of the impact spot. The voltage generated by the detector is amplified by the amplifier 31 and controls the intensity of the oscillograph ray via the control electrode 33 of the oscillograph tube. The tube 32 contains a deflection system consisting of the plate pairs 26', 27' and 28', 29', to which deflecting voltages are applied in synchronism with those applied to the plates 26, 27 and 28, 29. Since the deflecting voltages fed to the systems 26, 27 and 28, 29 as well as 26', 27', 28', 29' are, moreover, proportional to each other, an image of the impact spot of the beam 12 is thus formed on the fluorescent screen 34 of the tube 32.

Figure 5:
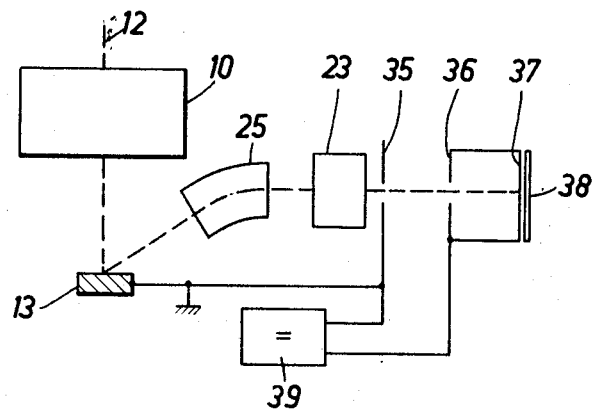
FIG. 5 is a elevation viewing system equipped with a postacceleration section.

FIG. 5 shows a viewing system which is particularly suited to those applications in which the energy of the particle radiation reflected from the workpiece is not sufficient for forming a desirably bright screen image. Here, a postacceleration section is inserted between the image-forming lens 23 and fluorescent screen 38, where the two accelerating electrodes 35 and 36 are provided. The fluorescent screen 38 is in the conventional manner provided with a thin metal foil 37 which is connected to the accelerating electrode 36. The generator 39 serves to generate the postacceleration voltage.

Figure 6:
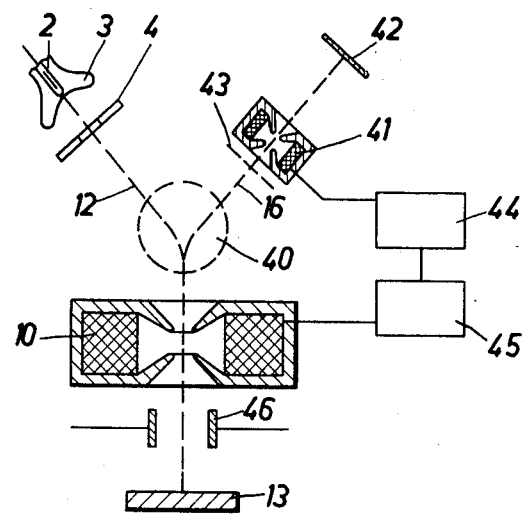
FIG. 6 is a partially sectioned elevation view of embodiment of the present invention in which the lens serving to focus the beam used for machining is employed as the first image-forming lens of the viewing system.

In the example shown in FIG. 6, the beam-generating system 2, 3, 4 is disposed at an angle to the axis of the focusing lens 10. An electromagnetic deflection field 40 serves to deflect the electron beam 12 into the axis of the lens 10. The latter focuses the electron beam 12 in the conventional manner on the workpiece 13. The electrons 16 reflected from the impact spot of the beam on the workpiece 13 pass through the focusing lens 10 and are deflected into the axis of the image-forming lens 41 by the deflection field 40. In this case, the viewing system consists of the first image-forming lens, which is here the focusing lens 10, the second image-forming lens 41 and the fluorescent screen 42. The focusing lens 10 forms an image of the beam's impact spot at 43, looking directly down on the spot, a desired arrangement in many applications. The deflection field 40 may also be disposed between the lens 10 and the workpiece 13.

Since in the aforementioned example the focusing of the electron beam 12 by means of the lens 10 influences also the focusing in the image plane 43, the image plane shift must be compensated for by the lens 41 in order to ensure that the image of the focus is always sharply defined on the fluorescent screen 42. For this purpose the power supply units 44 for the imaging lens 41 and 45 for the focusing lens 10 are interconnected.

If below the focusing lens 10 an electrostatic deflection system 46 is used to displace the electron beam 12 on the workpiece 13, the image of the focus formed on the fluorescent screen 42 will remain stationary even when the electron beam moves along the workpiece 13.

The arrangement shown in FIG. 6 serves at the same time as an ion trap, thus increasing the life of the cathode. In addition, the fluorescent screen 42 is automatically protected from evaporation of material from the workpiece.

Figure 7:
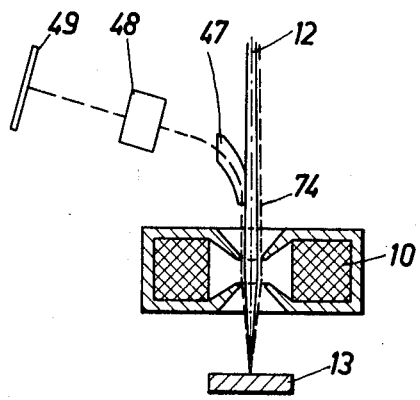
FIG. 7 is a partially sectioned elevation view of another embodiment of a viewing system according to the present invention in which the focusing lens is likewise used as the first image-forming lens.

In the example illustrated in FIG. 7, reflected particles 74 passing laterally of the main beam 12 through the lens 10 are separated by a deflection field 47 and projected onto the fluorescent screen 49 by means of an image-forming lens 48. In this case also, the focusing lens 10 is used as the first imagining lens of the viewing system, and the fluorescent screen is automatically protected from evaporation.

Figure 8:
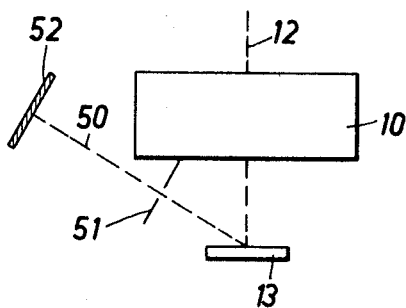
FIG. 8 is a partially sectioned elevation view of another embodiment of the present invention in which the X-ray radiation reflected from the impact spot of the beam is imaged with the aid of a pinhole diaphragm.

In the example shown in FIG. 8, the particle and/or X-ray radiation 50 reflected from the impact spot of the electron beam 12 on the workpiece 13 is imaged on a fluorescent screen 52 via a small pinhole diaphragm 51. This embodiment is particularly useful when large foci have to be imaged. It is advisable to provide a deflection field in the path of the viewing beam in order to protect the fluorescent screen.

Figure 9:
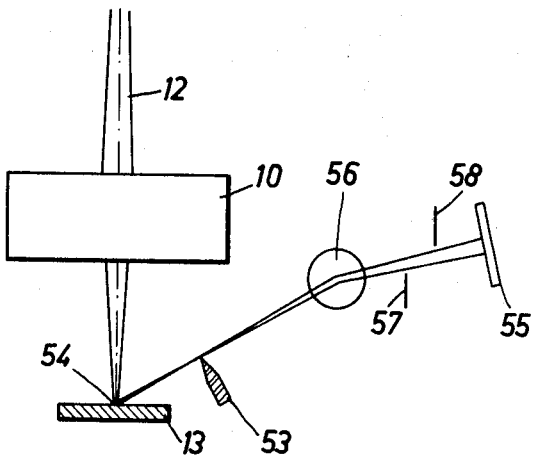
FIG. 9 is a partially sectioned elevation view of another embodiment of the present invention in which the radiation reflected from the impact spot projects an image of a knife edge onto a fluorescent screen.

In FIG. 9, a knife edge 53 is arranged on one side of the workpiece 13. This knife edge is imaged on the fluorescent screen 55 by the particle radiation reflected from the impact spot 54 of the beam in the form of a shadow. Between the knife edge 53 and the fluorescent screen 55 a deflection field 56 is indicated schematically, which serves to deflect the particle radiation. This deflection field and the protective shields 57 and 58 arranged in front of the fluorescent screen 55 prevent the accumulation of evaporated material on the fluorescent screen.

The deflection field may also be arranged between the workpiece 13 and the knife edge 53 to protect the knife edge 53 from evaporation as well as the screen.

The size of the beam's impact spot 54 can without difficulty be deduced from the sharpness range of the shadow image formed on the fluorescent screen 55. Thus, an optimally focused beam will produce a sharp transition from bright to dark on the fluorescent screen, while this transition is gradually weakened as the focus changes from the optimum.

If the knife edge 53 is replaced by a circular diaphragm, a shadow image of this diaphragm will be formed on the fluorescent screen 55. The transition from bright to dark will again be sharply defined when the beam 12 is optimally focused. When the impact point 54 is enlarged, the transition from bright to dark will be uniformly weakened along the entire periphery of the shadow image only if the impact spot is circular in shape. Any deviation from circular shape is revealed by different width of the transition zone from bright to dark, so that in this case it is also possible to obtain information on the shape of the impact spot.

Figure 10:
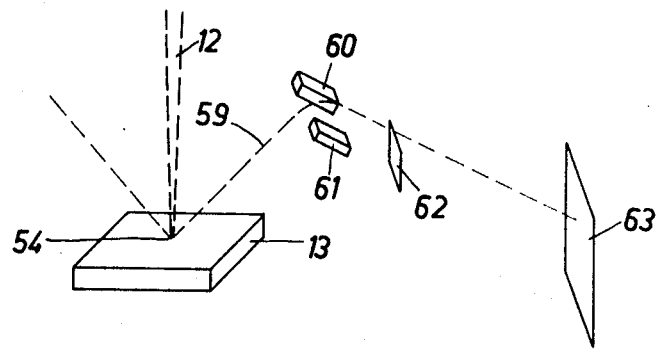
FIG. 10 is a perspective view of another embodiment of the present invention in which the radiation reflected from the impact spot images a knife edge on a fluorescent screen.

The deflection field 56 shown in FIG. 9 may, under certain circumstances, disturb the projection of the shadow image. FIG. 10 therefore shows a device in which such a disturbance is largely avoided. The particle radiation 59 reflected from the beam's impact spot 54 is deflected by the magnetic field formed between the pole shoes 60 and 61 and projects a shadow image of the knife edge 62 onto the fluorescent screen 63. In this instance, the magnetic field acts in the direction of the knife edge 62, so that the radiation is deflected around a horizontal axis. The deflected radiation follows an oblique path to the rear, while the direction of the magnetic field is obliquely forward.

Figure 11:
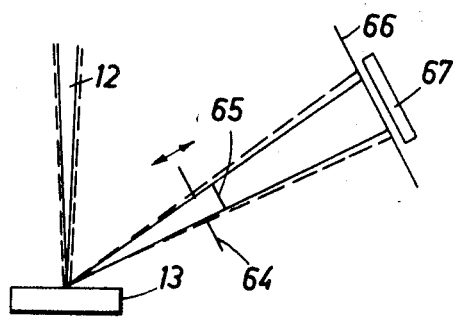
FIG. 11 is an elevation view of an embodiment of the present invention in which the radiation reflected from the impact spot projects the image of a pinhole diaphragm onto a fluorescent screen.

In the device presented schematically in FIG. 11, the radiation reflected from the workpiece 13 passes through an annular diaphragm 64 which can be displaced in the direction of the arrow. A stop 65 serves to cap the center of the diaphragm 64. When the beam 12 has been optimally focused—as is indicated by the solid lines—the diaphragms 64 and 65 can be so adjusted one with respect to the other that the fluorescent screen 66 remains dark. When the beam 12 is then defocused—as is indicated by the dashed lines—a bright annulus will appear on the fluorescent screen 66, the total brightness of which depends on the focusing state.

Behind the fluorescent screen 66 is a photoelectric detector 67. If this detector is connected to an indicator, it is possible to deduce optimal focusing of the beam 12 from minimum deflection of the indicator. The detector 67 can also be used in a simple manner to achieve automatic optimal focusing of the beam.

Figure 12:
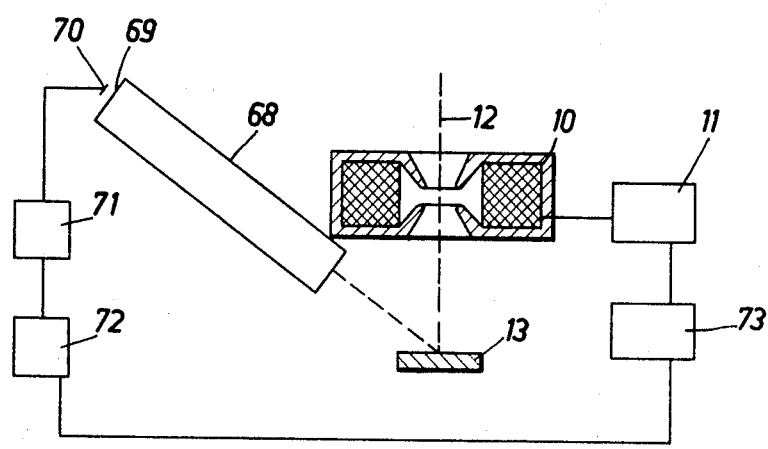
FIG. 12 is a partially sectioned view of an embodiment of the present invention which is suitable for the automatic adjustment of a focus of minimum size.

In FIG. 12, the viewing system 68 serves to project an image of the impact spot of the beam 12 on the workpiece 13 onto a fluorescent screen 69. In front of this screen is a photoelectric detector 70 which covers only the central portion of the screen image. This detector is connected to an amplifier 71 which in turn is connected to a unit 72. This unit generates a switching pulse when the voltage supplied by the detector 70 has reached a maximum value. The unit 73 influences the power supply unit 11 of the lens in such manner that the current flowing through the focusing lens 10 is periodically varied. This causes also the size of the beam's impact spot on the workpiece 13 to be varied periodically. During this variation, the focus passes through the state of optimal focusing, and at this instant a switching pulse is generated by the unit 72 which cuts off the unit 73 and thus keeps the current, which at this moment flows through the focusing lens, at a uniform level.

A focus of minimum size is thus adjusted automatically.

Instead of the viewing system 68 with the fluorescent screen 69 it is also possible to use a viewing system which is directly based on a photoelectric detector instead of the fluorescent screen 69.

This invention may be variously modified and embodied within the scope of the subjoined claims.

We claim:

1. A system for sensing the focusing condition of a beam of charged particles at a desired impact spot in an apparatus using said beam for the machining of a workpiece and having means for focusing said beam at said impact spot, comprising means responsive to charged particle radiation emanated from said impact spot in response to irradiation by said beam for forming an image of said impact spot at an image location, said image-forming means including at least one image-forming charged-particle lens, radiation detection means generally positioned in the vicinity of the image in said location and providing an output signal indicative of the radiation intensity incident upon its sensitive surface area, said sensitive surface area of said radiation-detection means being smaller than the image formed by said image-forming means with said beam being at optimum focused condition.

2. The device as recited in claim 1 and further including
   means for deflecting said image over the radiation-sensitive surface area of the radiation-detection means for varying the output signal, and
   an oscilloscope having an oscillograph ray deflected in synchronization with said image and controlled in intensity by said output signal.

3. The device as recited in claim 1 wherein said radiation-detection means further comprises
   a fluorescent screen positioned substantially coincident with the image plane, and
   a photoelectric detector having a photon-sensitive surface area smaller than said image, said photon surface area facing said screen at a side thereof opposite the side of said image-forming means.

4. The device as recited in claim 1 and further comprising
   deflection means interposed between said impact spot and the radiation-detection means for bending said radiation and providing said image at a plane forming an angle with direct line-of-sight paths with the impact spot to protect said radiation detector means from evaporated material travelling along said direct line-of-sight paths.

5. A viewing system for sensing the focusing condition of a beam of charged particles at the impact spot in apparatus using said beam for the machining of a workpiece, comprising
   means for focusing a beam of charged particles at a desired impact spot of the workpiece,
   means responsive to charged-particle radiation travelling generally reversely with respect to the beam from the impact spot for forming a focused image of the charged-particle radiation in an image plane,
   radiation-detection means generally positioned in the vicinity of the image in said plane and having a radiation-sensitive surface area smaller than the image formed by said image-forming means for an optimum focused beam of charged particles,
   said radiation detector means providing an output signal indicative of the radiation intensity incident upon its sensitive surface area.